(12) United States Patent
Park

(10) Patent No.: US 12,504,062 B2
(45) Date of Patent: Dec. 23, 2025

(54) HARMONIC DRIVE

(71) Applicant: Schaeffler Technologies AG & Co. KG, Herzogenaurach (DE)

(72) Inventor: Kyungho Park, Yokohama (JP)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/832,932

(22) PCT Filed: Dec. 6, 2022

(86) PCT No.: PCT/DE2022/100909
§ 371 (c)(1),
(2) Date: Jul. 25, 2024

(87) PCT Pub. No.: WO2023/147800
PCT Pub. Date: Aug. 10, 2023

(65) Prior Publication Data
US 2025/0146565 A1    May 8, 2025

(30) Foreign Application Priority Data
Feb. 3, 2022 (DE) ............... 10 2022 102 500.4

(51) Int. Cl.
*F16H 49/00* (2006.01)
*B25J 9/10* (2006.01)
(Continued)

(52) U.S. Cl.
CPC .......... *F16H 49/001* (2013.01); *B25J 9/1025* (2013.01); *F16H 57/027* (2013.01);
(Continued)

(58) Field of Classification Search
CPC ................ F16H 49/001; F16H 2049/003
See application file for complete search history.

(56) References Cited

U.S. PATENT DOCUMENTS

| 8,373,322 B2 * | 2/2013 | Wegner | H02K 7/1166 |
| | | | 310/83 |
| 9,371,900 B2 * | 6/2016 | Handa | F16H 57/021 |
| 11,041,557 B2 * | 6/2021 | Koroyasu | H02K 7/116 |

FOREIGN PATENT DOCUMENTS

| DE | 257670 A1 | 6/1988 |
| DE | 102007031850 A1 | 1/2009 |

(Continued)

OTHER PUBLICATIONS

DE102019117942A1—Machine Translation (Year: 2021).*

*Primary Examiner* — Jake Cook
(74) *Attorney, Agent, or Firm* — Price Heneveld LLP

(57) ABSTRACT

A harmonic drive is disclosed that includes a flexible ring element, which can be deformed in a locally radial manner in the circumferential direction by a wave generator with a non-round outer peripheral surface and which includes an outer toothing, and a rigid ring element with an inner toothing. The outer toothing of the flexible ring element at least partly meshes with the inner toothing of the rigid ring element in order to transmit a torque at at least one tooth engagement region, wherein the wave generator has a non-round first inner ring which protrudes at least partly into the flexible ring element and is rotationally fixed to a shaft. The harmonic drive additionally comprises a first bearing element, comprising a second inner ring and at least one first outer ring, said second inner ring being secured to the rigid ring element. Each outer ring is secured to the flexible ring element. Additionally, a drive cover is provided which is secured to a substantially radially extending section of the flexible ring element, and the drive cover is equipped with at least one opening on which a diaphragm is arranged in order to equalize gas pressure and/or temperature differences between the interior of the harmonic drive and the surroundings of the harmonic drive.

7 Claims, 6 Drawing Sheets

(51) Int. Cl.
*F16H 57/02* (2012.01)
*F16H 57/027* (2012.01)
*F16H 57/029* (2012.01)
*F16H 57/031* (2012.01)

(52) U.S. Cl.
CPC ......... *F16H 57/029* (2013.01); *F16H 57/031* (2013.01); *F16H 2049/003* (2013.01); *F16H 2057/02026* (2013.01); *F16H 2057/02073* (2013.01)

(56) References Cited

FOREIGN PATENT DOCUMENTS

| | | | |
|---|---|---|---|
| DE | 112012000058 T5 | | 2/2014 |
| DE | 112013004710 T5 | | 6/2015 |
| DE | 102019117942 A1 | * | 1/2021 |
| DE | 102019120344 A1 | | 1/2021 |
| JP | 2010532728 A | | 10/2010 |
| JP | 2011064265 A | | 3/2011 |
| JP | 2017207113 A | | 11/2017 |
| JP | 2021042848 A | | 3/2021 |

\* cited by examiner

HARMONIC DRIVE

CROSS-REFERENCE TO RELATED APPLICATIONS

This application is the U.S. National Phase of PCT Appln. No. PCT/DE2022/100909 filed Dec. 6, 2022, which claims priority to DE 10 2022 102 500.4 filed Feb. 3, 2022, the entire disclosures of which are incorporated by reference herein.

TECHNICAL FIELD

The disclosure relates to a harmonic drive for a robot. The disclosure further relates to a robot having such a harmonic drive.

BACKGROUND

DE 11 2012 000 058 T5 discloses a harmonic drive which has a fixed, internally toothed gear wheel, a flexible, externally toothed gear wheel arranged within the fixed, internally toothed gear wheel, and a wave generator. The wave generator causes the flexible, externally toothed gear wheel to bend into an elliptical shape and partially mesh with the fixed, internally toothed gear. Furthermore, the wave generator causes the engagement positions of the two gears to move in the circumferential direction. The flexible, externally toothed gear wheel has a cylindrical drum portion that has an open edge at one end and is capable of bending in the radial direction. The cylindrical drum portion has an outer toothing forming portion in which the outer toothing is formed, and a pressed portion that is pressed in the radial direction by the wave generator to cause the outer toothing forming portion to bend into an elliptical shape. The outer toothing forming portion and the pressed region are formed in the direction of the central axis of the flexible, externally toothed gear wheel in different regions of the cylindrical drum portion. The wave generator is arranged outside the cylindrical drum portion and is configured to press the pressed portion in a radial direction from outside to inside and cause the pressed portion to bend into an elliptical shape.

SUMMARY

The object of the present disclosure is to further develop a harmonic drive, in particular to improve the service life of consumable parts of the harmonic drive. The object is achieved according to the subject matter disclosed in the present disclosure. Preferred embodiments are disclosed in the claims, the description and the figures.

A harmonic drive comprises a flexible ring element, which can be deformed in a locally radial manner in the circumferential direction by a wave generator with a non-round outer peripheral surface and which comprises an outer toothing, and a rigid ring element with an inner toothing, wherein the outer toothing of the flexible ring element at least partly meshes with the inner toothing of the rigid ring element in order to transmit a torque at at least one tooth engagement region, wherein the wave generator has a non-round first inner ring which protrudes at least partly into the flexible ring element and is connected in a rotationally fixed manner to a shaft, the harmonic drive additionally comprising a first bearing element, comprising a second inner ring and at least one first outer ring, wherein said second inner ring is secured to the rigid ring element, and wherein each outer ring is secured to the flexible ring element, wherein a drive cover is additionally provided which is secured to a substantially radially extending section of the flexible ring element. For example, the wave generator and thus also the first inner ring have an elliptical or oval cross-sectional shape. The drive cover preferably covers the flexible ring element from the input side.

According to the first aspect of the disclosure, the drive cover is equipped with at least one opening, on which a diaphragm is arranged in order to equalize gas pressure and/or temperature differences between an interior of the harmonic drive and the surroundings of the harmonic drive.

Each opening connects the interior of the harmonic drive with the external surroundings of the gear. The opening is to be understood as a recess or hole, wherein the diaphragm completely covers the corresponding opening. Each opening extends essentially in the axial direction through the respective component on which it is formed. The interior of the harmonic drive described here is spatially separated from the external surroundings of the harmonic drive, wherein the interior is only pneumatically and/or thermally connected to the surroundings of the harmonic drive, in particular the external atmosphere, via the respective diaphragm arranged at the corresponding opening. In this context, "pneumatically connected" means that pressure equalization between two spaces is possible via the respective diaphragm. In this context, "thermally connected" means that temperature equalization between two spaces is possible via the respective diaphragm. At the same time, the respective diaphragm separates the interior of the harmonic drive from the external surroundings of the harmonic drive, so that neither liquid nor solid substances can pass from one area to the other.

The harmonic drive gives off heat when switching from speed to torque to increase the internal temperature of the harmonic drive. The internal pressure of the harmonic drive also increases. A small amount of heat is outwardly dissipated through the housing or the contact surface of each part. The remaining heat is released outwardly via the respective diaphragm and the corresponding opening. This prevents an unwanted increase in the internal pressure of the harmonic drive, which in turn would cause additional stress on the seals and bearings of the harmonic drive. In other words, the durability of the seal and the bearings of the harmonic drive is positively influenced by the respective diaphragm.

A temperature and/or pressure increase of the lubrication of the components in the interior of the harmonic drive that are movable and/or rotatable relative to one another is suppressed by means of the diaphragm. The diaphragm also separates liquids and/or solid media in the interior and the surroundings. In other words, the penetration and/or inflow of foreign substances from outside into the interior of the harmonic drive is prevented. In the opposite direction, the diaphragm is designed in such a way that no substances from the interior of the harmonic drive, in particular oil or grease, can escape through the respective opening.

According to one embodiment, the respective opening and the diaphragm are designed and arranged such that a temperature and/or pressure increase in a lubricant chamber is suppressed. In other words, temperature and/or pressure equalization between the interior and the surroundings of the harmonic drive takes place via the respective diaphragm. In this case, the interior is to be understood as the space inside the harmonic drive in which parts of the harmonic drive that can be rotated relative to one another are arranged and are mounted and supported so that they can rotate relative to one another via respective bearings. The interior of the harmonic drive is therefore to be understood as a lubrication chamber in which the aforementioned bearings of the harmonic drive are supplied with lubricant, in particular lubricating grease. In other words, the interior in this case is a space filled with lubricant.

The diaphragm is a diaphragm filter, wherein the diaphragm is preferably made of an aluminum ceramic, for example comprising aluminum oxide and silicon oxide. The diaphragm has an indeterminate number of micropores, wherein the pore size of the narrowly distributed pores is preferably substantially between 0.1 and 50 μm. The diaphragm is designed in such a way that the pores do not deform due to temperature and/or pressure. In addition, the diaphragm is heat-resistant and mechanically stable. The diaphragm is also chemically resistant.

The wave generator is operatively connected to the shaft, wherein the shaft is preferably at least indirectly driven by an electrical machine in order to set the wave generator in a rotational movement. For example, the wave generator, in particular the first inner ring, has an elliptical or oval cross-sectional shape. The first inner ring and the shaft are preferably two separate components, wherein the first inner ring is pressed onto the shaft, for example, to create a rotationally fixed connection. The shaft can also be connected to the first inner ring in a rotationally fixed manner via a drive toothing system. Alternatively, it is conceivable to form the first inner ring and the shaft as a single piece. The wave generator forms the drive of the harmonic drive and, in the case of a two-part design of the shaft and the first inner ring, is preferably pressed into the flexible or elastically deformable ring element together with an associated bearing element. The shaft can be designed as a hollow shaft or as a solid shaft.

The flexible ring element, also called "Flexspline", is a high-strength, torsion-resistant sleeve element. It is designed to be so flexible that it can at least partly accommodate the wave generator axially and is thus locally deformable depending on the external shape of the wave generator. The wave generator is rotatable relative to the flexible ring element or is slidably mounted therein. Thus, the flexible ring element assumes the non-round shape of the wave generator and deforms elastically in a substantially radial direction analogous to the direction of rotation of the wave generator. In other words, during operation of the harmonic drive, the wave generator is set into a rotational movement, which causes the flexible ring element to undergo a circumferential deformation.

Preferably, the outer toothing of the flexible ring element for transmitting a torque is in two symmetrically opposite tooth engagement regions, relative to the axis of rotation of the wave generator, at least partly in toothed engagement with the inner toothing of the rigid ring element.

Preferably, a plurality of rolling elements are arranged at a distance from one another between an outer peripheral surface of the inner ring and an inner peripheral surface of the flexible ring element. In other words, the elastic ring element is an outer ring, wherein the rolling elements roll spatially between the inner ring and the outer ring. Alternatively, the wave generator may have an additional outer ring arranged radially between the rolling elements and the flexible ring element. In this case, during assembly, the outer ring of the wave generator comes into contact with the inner circumferential surface of the flexible ring element. This simplifies both handling of the wave generator part and assembly.

The rigid ring element, also called "circular spline", is a torsion-resistant, rigid ring whose inner toothing has more teeth than the outer toothing of the flexible ring element. The rotation of the wave generator causes a permanent, circumferential toothed engagement between the flexible ring element and the rigid ring element. In other words, the opposing tooth engagement regions move continuously around the axis of rotation of the wave generator or in the circumferential direction during rotation of the wave generator. Since the flexible ring element has fewer teeth than the rigid ring element, rotation of the wave generator causes a relative movement of the flexible ring element to the rigid ring element. The rolling elements roll between the inner ring and the flexible ring element or the outer ring of the wave generator.

During operation, the wave generator rotates, causing the first inner ring of the wave generator to be twisted relative to the flexible ring element or the outer ring of the wave generator, which is separately accommodated in a rotationally fixed manner therein. The flexible ring element deforms elastically analogously to the direction and speed of rotation of the wave generator. In other words, during operation of the harmonic drive, the wave generator is set into a rotational movement, which causes the flexible ring element to undergo a circumferential deformation. The first inner ring and the flexible ring element or, if present, the outer ring of the wave generator form a second bearing element of the harmonic drive.

The shaft is preferably designed to be rotatably mounted relative to a robot arm segment, in particular an output flange, via a third bearing element. The shaft can be designed at least in sections as a hollow shaft or as a solid shaft, wherein the third bearing element is arranged radially inside the shaft. In contrast to the first and second bearing elements, the third bearing element is preferably a floating bearing and enables rotation of the shaft relative to another part, in particular a robot arm segment or an output flange.

The diaphragm is preferably connected in a materially bonded manner to the drive cover. The diaphragm is preferably glued to an interior of the drive cover facing the interior. This improves the sealing effect of the diaphragm and effectively protects the interior of the harmonic drive from external influences, in particular unwanted solid and/or liquid substances. The material connection between the diaphragm and the associated component can be realized by a double-sided coated tape.

According to a further embodiment, the interior is divided into different segments, on the one hand into the space filled with lubricant, i.e., a lubrication area, and at least one further segment which is sealed from the lubrication area. The further segment can be provided to accommodate at least part of the electronics of the harmonic drive. In this case, the diaphragm additionally suppresses a temperature and/or pressure increase of the components or elements arranged in the further interior segment.

In this sense, the drive cover is designed to accommodate a torque sensor and/or a printed circuit board, wherein the torque sensor and/or the printed circuit board is arranged in a sensor holder of the drive cover, which is sealed from the remaining interior of the harmonic drive. This means that the interior of the harmonic drive is divided into a part that holds the lubricant and a part that holds the electronic components of the harmonic drive, with the two parts being sealed from one another.

The torque sensor mounted on the harmonic drive has a circuit board or printed circuit board. This is located in the harmonic drive, here on the drive cover. As already mentioned, the temperature and pressure in the harmonic drive increase, especially during switching operations. Since the sensor and possibly the printed circuit board are also located in the harmonic drive, the temperature of these parts also rises and they are subjected to pressure. The printed circuit board of the torque sensor consists of electronic components that are affected by temperature changes, which in turn can negatively affect the operation and/or lifetime of the parts on the circuit board.

Likewise in this embodiment, a small amount of heat is outwardly dissipated through the housing or the contact surface of each part. The remaining heat is released outwardly via the respective diaphragm and the corresponding opening. This prevents an unwanted increase in the internal pressure of the harmonic drive, which in turn would cause additional stress on the seals and bearings of the harmonic drive. In other words, the durability of the torque sensor and/or the printed circuit board is positively influenced by the respective diaphragm.

A recess or depression can be provided on the drive cover, which is to be understood as a sensor holder and in which at least the printed circuit board of the torque sensor is accommodated. The sensor holder is also located in the interior of the harmonic drive, particularly on the inside of the drive cover. The sensor holder is sealed against the interior of the harmonic drive, which is designed as a lubrication chamber.

In this sense, at least one seal is arranged radially between the drive cover and the flexible ring element for sealing the sensor holder from the remaining interior of the harmonic drive. The sealing element is preferably a lip seal.

Wiring of the torque sensor and/or the printed circuit board can be arranged, secured and, if necessary, passed through the drive cover.

According to a second aspect of the disclosure, at least the second inner ring of the first bearing element is equipped with at least one opening, on which a diaphragm is arranged in order to equalize gas pressure and/or temperature differences between an interior of the harmonic drive and the surroundings of the harmonic drive. In particular, the opening extends axially through the second inner ring, the rigid ring element and any output elements arranged thereon. An output element can, for example, be a slowly rotating output flange. In this case, it may be necessary to provide a plurality of openings on the rotating element in order to achieve the desired temperature and/or pressure equalization. Furthermore, with regard to the function and effects of the diaphragm at the corresponding opening, reference is made to the explanations relating to the first aspect of the disclosure.

Such an arrangement of the respective opening is particularly suitable if the part of the interior of the harmonic drive that receives the lubricant is not connected to the drive cover.

Preferably, in this embodiment, the diaphragm is connected in a materially bonded manner to the second inner ring. The diaphragm is preferably glued to an interior of the second inner ring facing the interior.

For all exemplary embodiments, the first bearing element is preferably a crossed roller bearing, comprising the second inner ring, the first outer ring and a second outer ring arranged axially adjacent to the first outer ring. Between the second inner ring and the first outer ring, a plurality of rollers are arranged at a distance from one another. Between the second inner ring and the second outer ring, a plurality of rollers are also arranged at a distance from one another. Crossed roller bearings are advantageous for moment loads and stresses from all directions including from the axial and radial direction. The rollers of the two rows of rolling elements are arranged in an X-arrangement.

The disclosure also relates to a robot comprising a harmonic drive according to the disclosure according to the first aspect of the disclosure or the second aspect of the disclosure. In particular, the harmonic drive according to the disclosure is arranged in a joint for a robot arm and acts at least indirectly between two robot arm segments.

BRIEF DESCRIPTION OF THE DRAWINGS

Further embodiments of the disclosure are described in greater detail below with reference to the figures, wherein identical or similar elements are provided with the same reference sign. In the figures.

DETAILED DESCRIPTION

Figure 1:
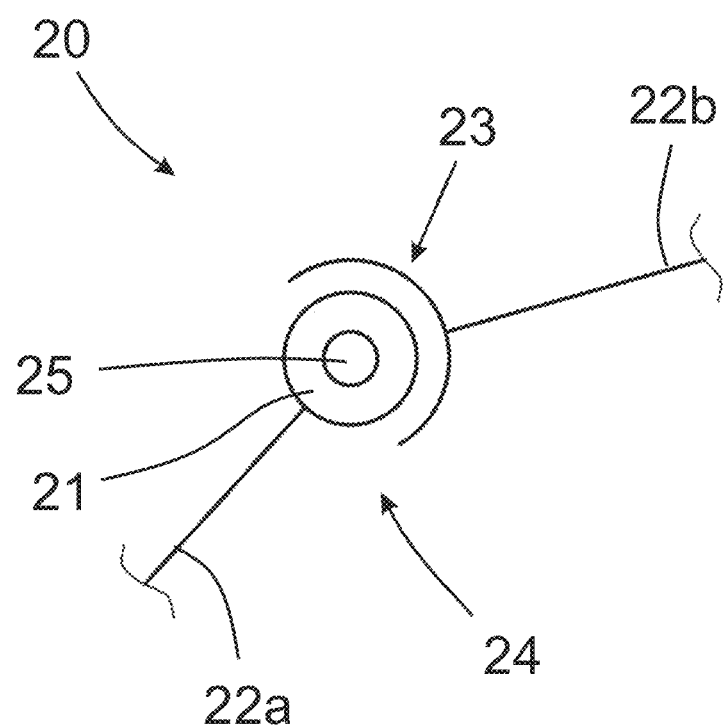
FIG. 1 shows a simplified schematic representation of a partially shown robot with a harmonic drive according to the disclosure according to a first embodiment.

FIG. 1 shows a section of a robot 20. Between a first robot arm segment 22a and a second robot arm segment 22b, a joint 23 is arranged which connects the two robot arm segments 22a, 22b with each other in an articulated manner. To change the position of the two robot arm segments 22a, 22b relative to each other, the robot 20 has a drive unit 24, comprising an electric motor 25 and a harmonic drive 21 according to the disclosure.

According to FIGS. 2 to 5 and FIG. 7, a harmonic drive according to the disclosure 21 according to a first embodiment comprises a flexible ring element 2 with an outer toothing 3, which can be deformed circumferentially in the radial direction by a wave generator 1, and a rigid ring element 4 with an inner toothing 5, wherein the outer toothing 3 of the flexible ring element 2 meshes with the inner toothing 5 of the rigid ring element 4 in order to transmit a torque at two opposite tooth engagement regions 8.

The harmonic drive 21 has a first bearing element 11 which is designed as a crossed roller bearing. The first bearing element 11 comprises a second inner ring 12, a first outer ring 13a and a second outer ring 13b arranged axially adjacent to the first outer ring 13a. A respective rolling element row with a plurality of rolling elements 28 is arranged between the second inner ring 12 and the respective outer ring 13a, 13b. The second inner ring 12 is secured to the rigid ring element 4, wherein the outer rings 13a, 13b are secured to a radially extending section 2a of the flexible ring element 2.

The wave generator 1 further comprises a non-round second bearing element 26 which is arranged radially between the flexible ring element 2 and a shaft 10 of the harmonic drive 21. The second bearing element 26 has a first inner ring 9 which is arranged in a rotationally fixed manner on an outer peripheral surface 27 of the shaft 10, and a third outer ring 29 which is arranged radially inside a flexible ring element 2 of the harmonic drive 21. The wave generator 1 can be set into a rotational movement via the shaft 10 by an electric motor (not shown here).

The first inner ring 9 and the third outer ring 29 of the non-round, in particular elliptical, second bearing element 26 have, for example, an elliptical outer geometry, wherein the outer peripheral surface of the third outer ring 29 comes to rest in a rotationally fixed manner on an inner peripheral surface of the flexible ring element 2. Before the assembly of the second bearing element 26, the third outer ring 29 has a substantially round outer geometry, which, however, is elastically deformed into the elliptical outer geometry during assembly depending on the outer geometry of the first inner ring 9. The second bearing element 26 is pressed into the flexible ring element 2 so that the wave generator 1 with the second bearing element 26 protrudes into the flexible ring element 2. The flexible ring element 2 takes on the elliptical outer shape of the wave generator 1. During operation of the harmonic drive 21, the wave generator 1 is set in a rotational movement via the shaft 10, whereby the third outer ring 29 and the flexible ring element 2 are deformed in a locally radial manner. In other words, the rotation of the wave generator 1 about its axis of rotation 7 causes the flexible ring element 2 and the third outer ring 29 to be circumferentially deformed.

Since the flexible ring element 2 adapts to the elliptical shape of the wave generator 1, the flexible ring element 2 with its outer toothing 3 only engages with the inner toothing 5 of the rigid ring element 4 at the respective tooth engagement region 8. The rigid ring element 4 is to be understood in this case as a ring gear.

The harmonic drive 21 further comprises a drive cover 14 which is secured to the substantially radially extending section 2a of the flexible ring element 2 on the input side, i.e., on a side of the substantially radially extending section 2a opposite the outer rings 13a, 13b of the first bearing element 11.

Figure 3:
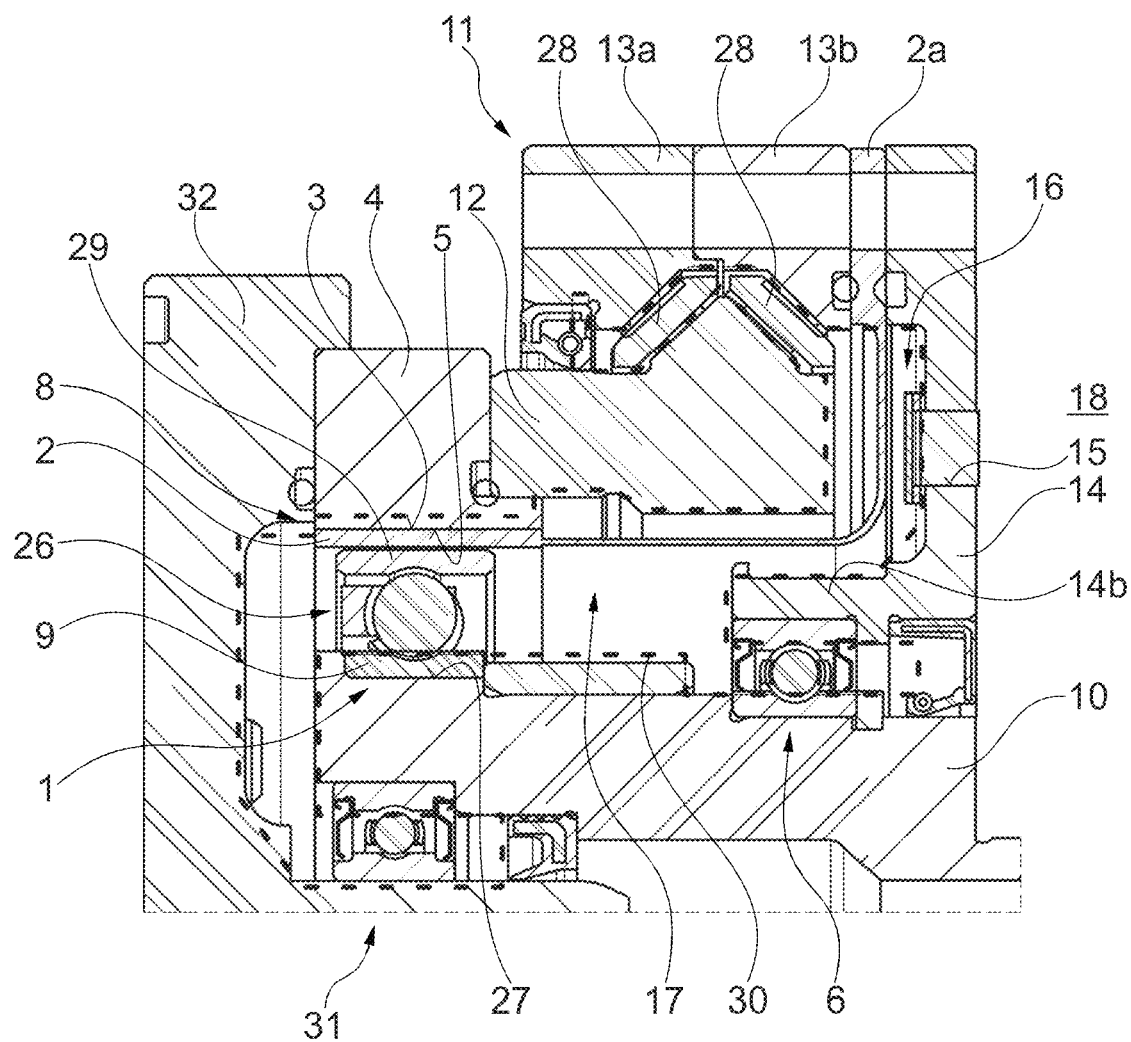
FIG. 3 shows a schematic partial longitudinal view of the harmonic drive according to the disclosure according to FIG. 1 and FIG. 2.
Figure 5:
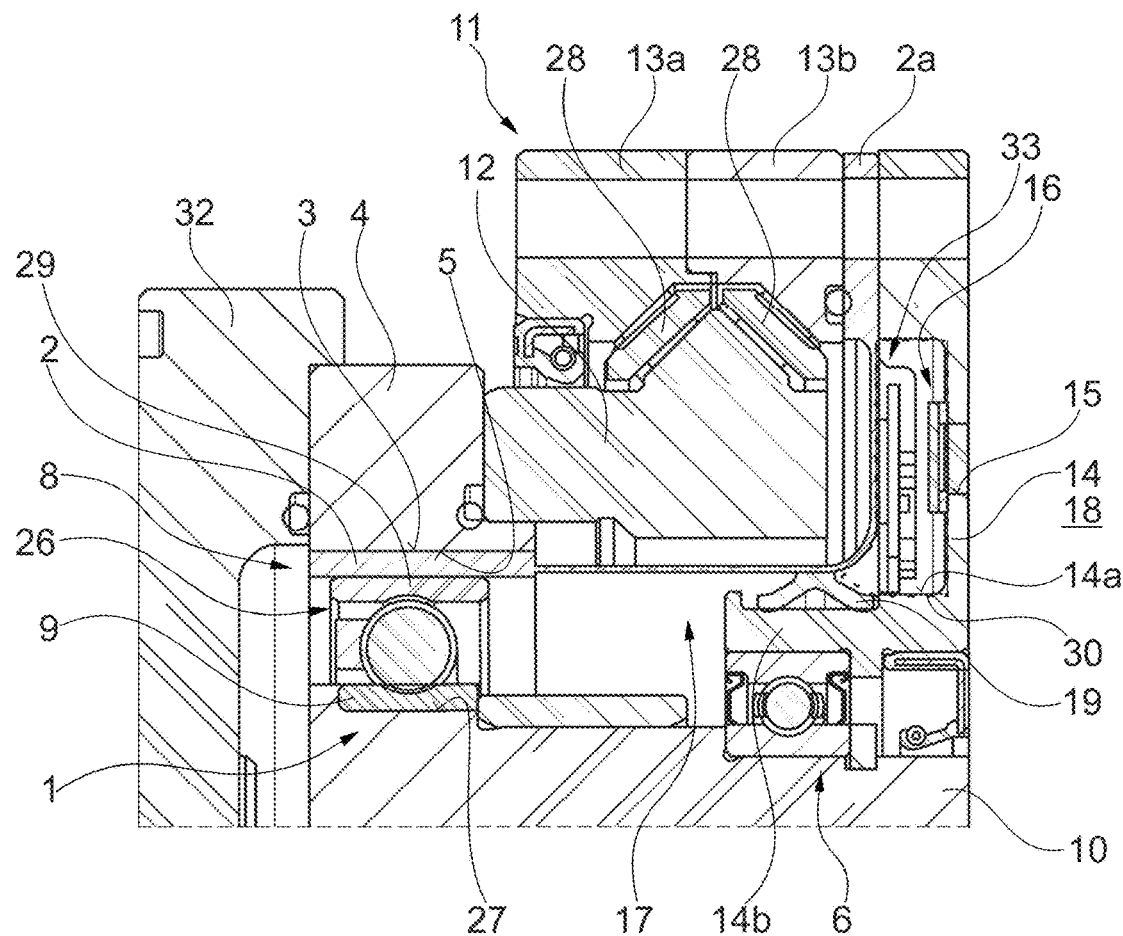
FIG. 5 shows a schematic partial longitudinal view of the harmonic drive according to the disclosure according to FIG. 4.

According to FIGS. 3 and 5, an axial opening 15 is formed on the drive cover 14, at which a diaphragm 16 is arranged. On the one hand, the diaphragm is designed to equalize gas pressure and temperature differences between an interior 17 of the harmonic drive and the surroundings 18 of the harmonic drive. Furthermore, the diaphragm 16 is provided to prevent substances, in particular lubricants, from escaping from the harmonic drive 21 and to prevent substances, in particular dirt and/or moisture, from entering the harmonic drive 21.

Figure 6:
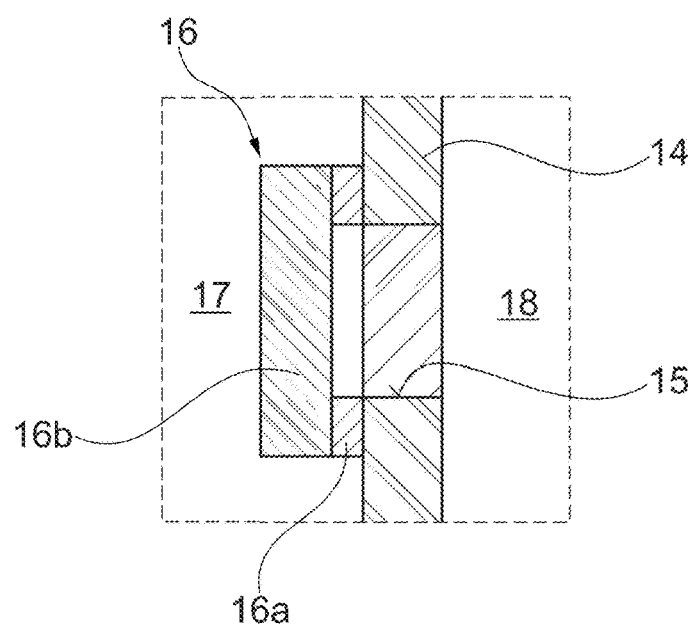
FIG. 6 shows a highly schematic view of an opening on a drive cover of the harmonic drive according to the disclosure.

As shown by way of example in FIG. 6, the diaphragm 16 is connected in a materially bonded manner to the drive cover 14. The diaphragm 16 has a tape 16a coated on both sides with an adhesive, which is arranged between a diaphragm body 16b and the drive cover 14. The band 16a ensures that the gas pressure reduction and the dissipation of excess heat, i.e., the gas pressure and temperature equalization, takes place exclusively via the diaphragm body 16b. During operation of the harmonic drive 21, there is an increase in temperature and an increase in the internal pressure in the interior 17 of the harmonic drive 21. This is partly absorbed and dissipated via a housing (not shown here). The remaining, substantial part of the additional heat is dissipated via the diaphragm 16 and the opening 15 into the surroundings 18 of the harmonic drive 21. The opening also facilitates pressure equalization between the interior 17 and the surroundings 18 or outside atmosphere.

Figure 2:
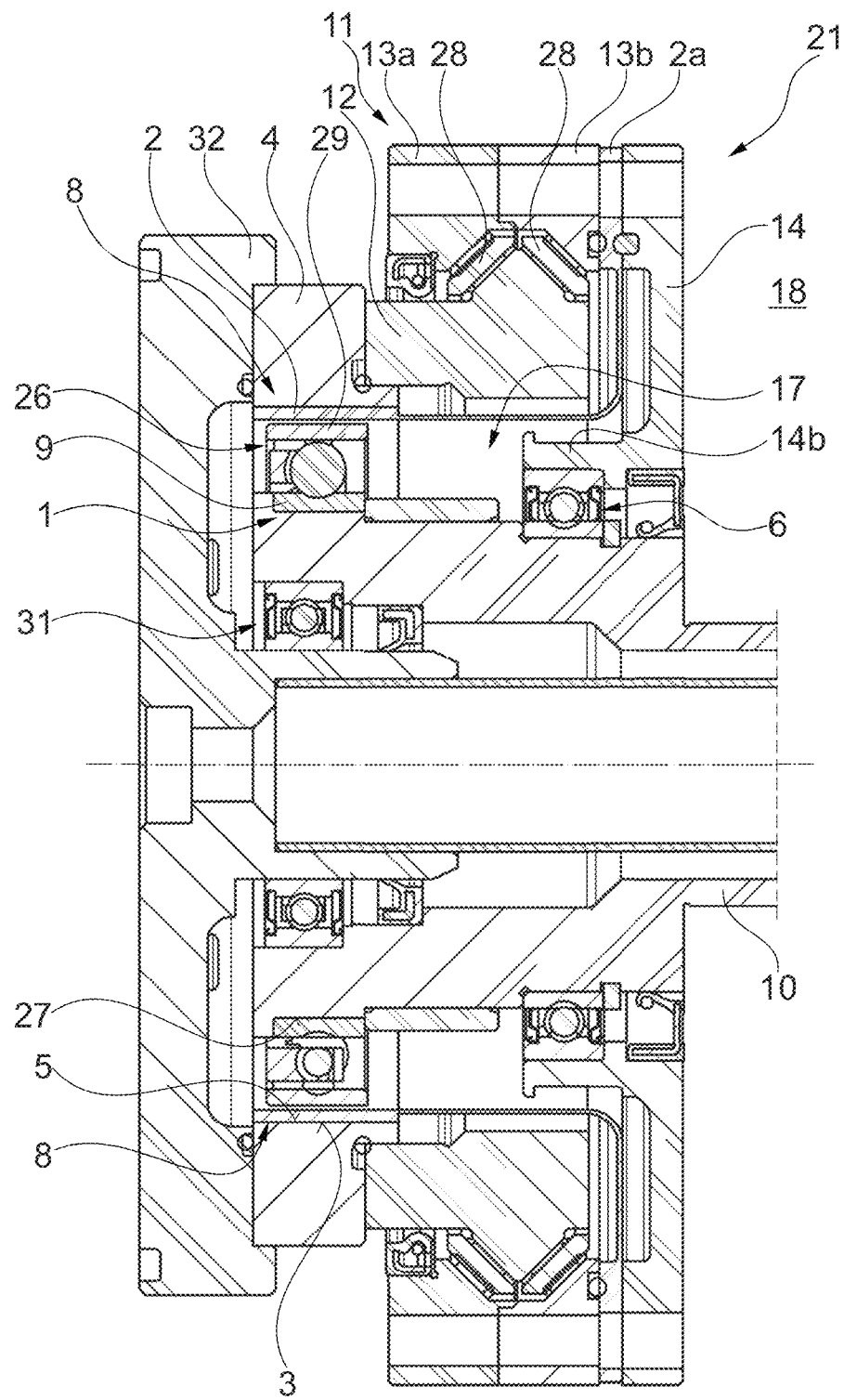
FIG. 2 shows a schematic longitudinal view of the harmonic drive according to the disclosure according to FIG. 1.

According to the first embodiment according to FIG. 2 and FIG. 3, the interior 17 of the harmonic drive 21 is to be understood as the lubricating region of the harmonic drive 21. The interior 17 is formed within the dashed line 30 according to FIG. 3 and in the present case comprises the two rows of rolling elements with the rolling elements 28 of the first bearing element 11, the second bearing element 26 and a third bearing element 31 which rotatably supports the shaft 10 relative to an output flange 32, and a fourth bearing element 6 which rotatably supports the shaft 10 relative to the drive cover 14.

Figure 4:
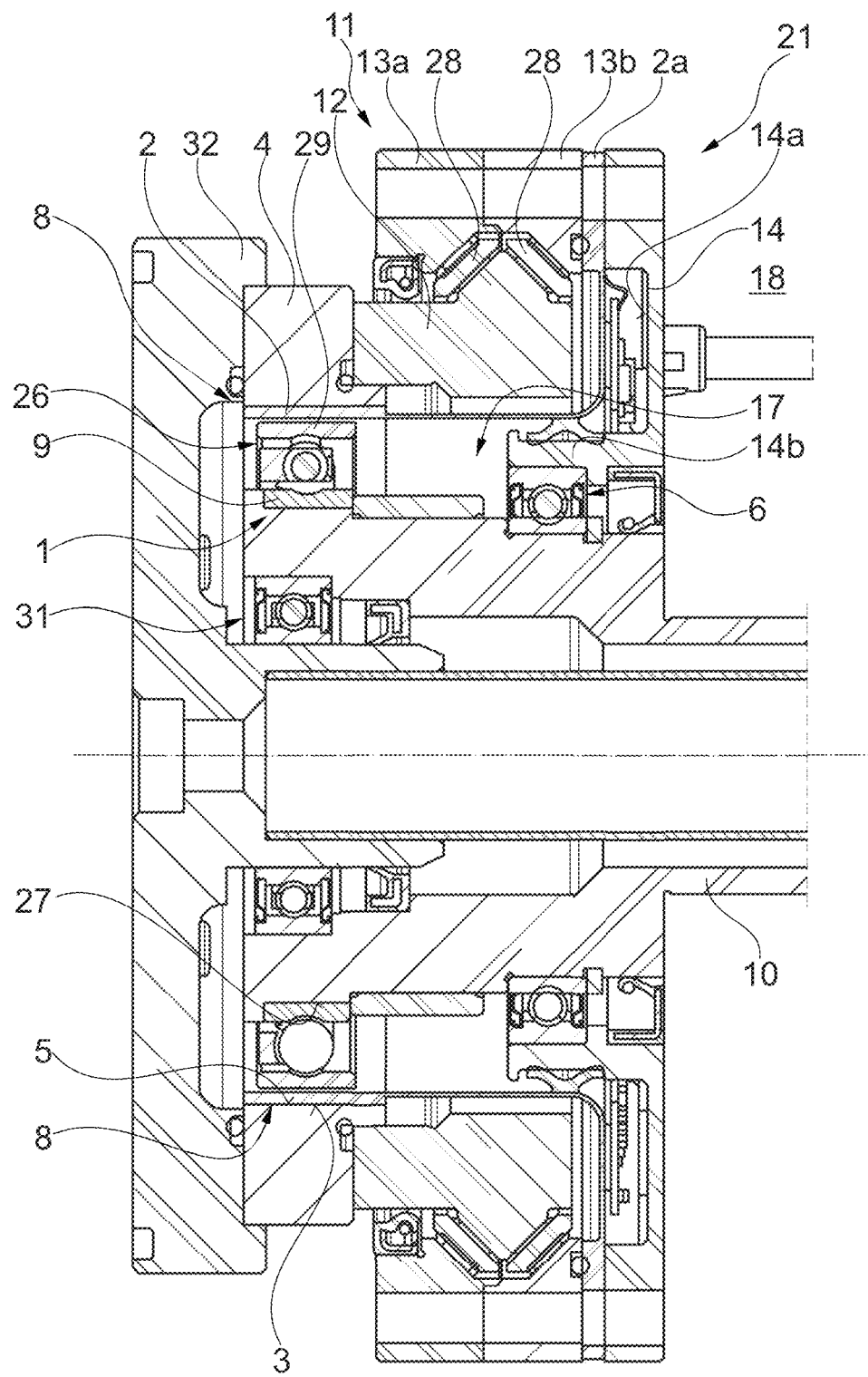
FIG. 4 shows a schematic longitudinal view of the harmonic drive according to the disclosure according to a third embodiment.

According to the second exemplary embodiment shown in FIG. 4 and FIG. 5, in contrast to the first exemplary embodiment, the interior 17 of the harmonic drive 21 is divided into two areas, on the one hand into the lubrication area analogous to the first exemplary embodiment and an electronics receiving area, here formed as a sensor holder 14a on the drive cover 14. FIG. 5 shows the sensor holder 14a using the dashed line 30. A printed circuit board 33 for a torque sensor is arranged within the sensor holder 14a. The sensor holder 14a is sealed from the lubrication area by a seal 19 designed as a lip seal, wherein the seal 19 is arranged radially between an axial section 14b of the drive cover 14 and the flexible ring element 2. Thus, the sensor holder 14a of the drive cover 14 is sealed from the remaining interior 17 of the harmonic drive 21, here the part of the interior 17 designed as a lubrication area. For further information, please refer to the above explanations.

Figure 7:
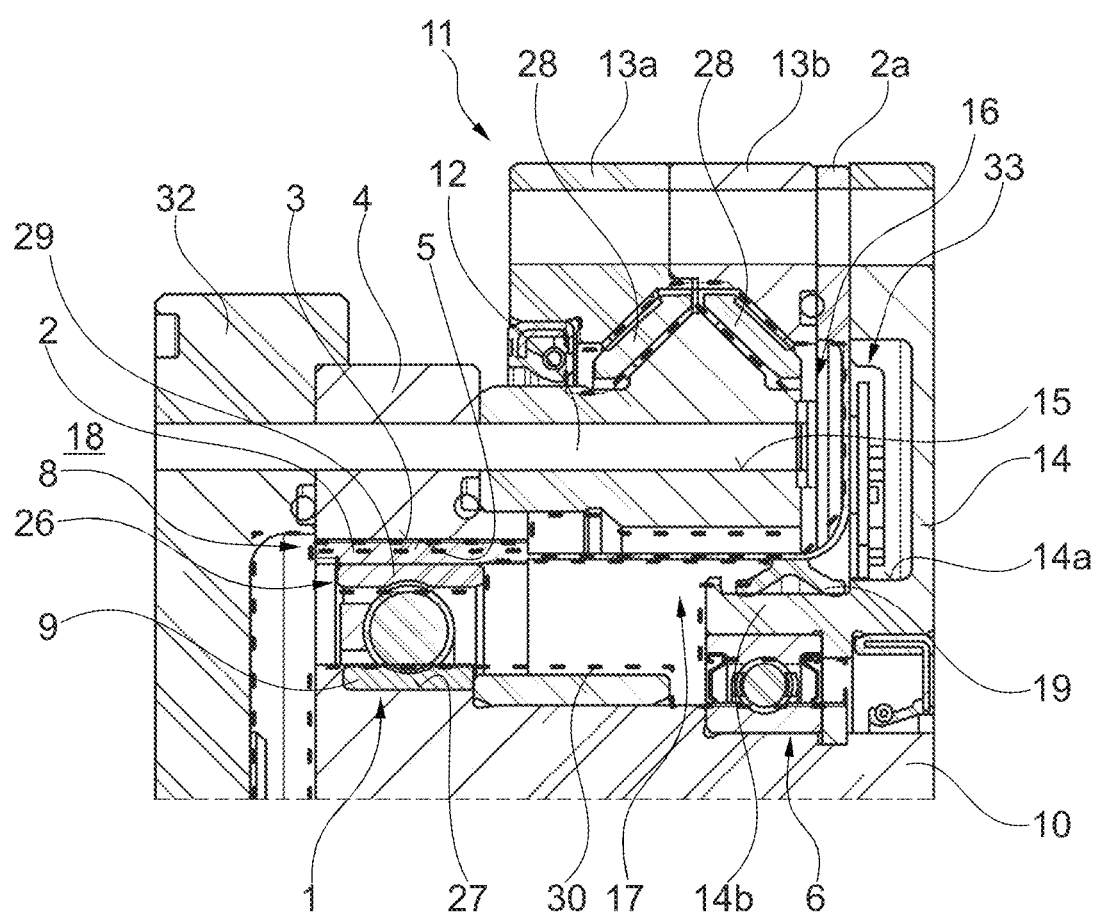
FIG. 7 shows a schematic partial longitudinal view of the harmonic drive according to the disclosure according to a third embodiment.

The harmonic drive 21 according to the third embodiment according to FIG. 7 is substantially identical to the second embodiment of FIGS. 4 and 5. The difference in the present case is that the sensor holder 14a is fluidically and spatially separated from the interior 17 of the harmonic drive 21, which is designed as a lubrication area, analogously to the first embodiment. The dashed line 30 schematically surrounds the interior 17 of the harmonic drive 21, which forms the lubrication area. Due to this spatial separation, an opening 15 is formed on the second inner ring 12 of the first bearing element 11, on which a diaphragm 16 is arranged, via which the gas pressure and temperature equalization takes place analogously to the previous embodiments between the interior 17 of the harmonic drive 21 and the surroundings 18 of the harmonic drive 21. The diaphragm 16 is connected to the second inner ring 12 in a materially bonded manner. Due to the present structural design, the opening 15 extends axially through the second inner ring 12, the rigid ring element 4 and the output flange 32. Since the rigid ring element 4 and the output flange 32 are slowly rotating components, they can have additional openings—not shown here—distributed over the circumference in order to ensure sufficient heat dissipation and pressure equalization. This exemplary embodiment is intended to illustrate that the respective opening 15 can also be arranged on components of the harmonic drive 21 other than the drive cover 14. In any case, a diaphragm 16 is provided at the respective opening 15, irrespective of its position, in order to prevent an exchange of substances between the interior 17 and the surroundings and to realize heat dissipation to the surroundings 18 and pressure equalization between the interior 17 and the surroundings 18.

LIST OF REFERENCE SIGNS

1 Wave generator
2 Flexible ring element
2a Radially extending section
3 Outer toothing 4 Rigid ring element
5 Inner toothing
6 Fourth bearing element
7 Axis of rotation
8 Tooth engagement region
9 First inner ring or inner ring of the second bearing element
10 Shaft
11 First bearing element
12 Second inner ring of the first bearing element
13a, 13b Outer ring of the first bearing element
14 Drive cover
14a Sensor holder of the drive cover
14b Axial section of the drive cover
15 Opening
16 Diaphragm
17 Interior
18 Surroundings
19 Seal
20 Robot
21 Harmonic drive
22a, 22b Robot arm segment
23 Joint
24 Drive unit
25 Electric motor
26 Second bearing element
27 Outer peripheral surface of the shaft
28 Rolling element of the first bearing element
29 Third outer ring of the second bearing element
30 Dashed line
31 Third bearing element
32 Output flange
33 Printed circuit board

The invention claimed is:

1. A harmonic drive, comprising:
a flexible ring element, which can be deformed in a locally radial manner a circumferential direction by a wave generator with a non-round outer peripheral surface and which comprises an outer toothing, and
a rigid ring element with an inner toothing, wherein the outer toothing of the flexible ring element at least partly meshes with the inner toothing of the rigid ring element in order to transmit a torque at at least one tooth engagement region, wherein the wave generator has a non-round first inner ring which protrudes at least partly into the flexible ring element and is connected to a shaft in a rotationally fixed manner, the harmonic drive comprising a first bearing element, comprising a second inner ring and at least one first outer ring, wherein said second inner ring is secured to the rigid ring element, and wherein each outer ring is secured to the flexible ring element, wherein a drive cover is additionally provided which is secured to a substantially radially extending section of the flexible ring element,
wherein the drive cover is equipped with at least one opening, on which a diaphragm is arranged in order to equalize gas pressure and/or temperature differences between an interior of the harmonic drive and the surroundings of the harmonic drive, and wherein at least one seal extends from the flexible ring element to the drive cover.

2. The harmonic drive according to claim 1, wherein the diaphragm is connected to the drive cover in a materially bonded manner.

3. The harmonic drive according to claim 1, wherein the drive cover is designed to accommodate a torque sensor and/or a printed circuit board, wherein the torque sensor and/or the printed circuit board is arranged in a sensor holder of the drive cover, which is sealed from the remaining interior of the harmonic drive by the at least one seal.

4. The harmonic drive according to claim 3, wherein the at least one seal is arranged radially between the drive cover and the flexible ring element for sealing the sensor holder from the remaining interior of the harmonic drive.

5. A harmonic drive, comprising:
a flexible ring element, which can be deformed in a locally radial manner in a circumferential direction by a wave generator with a non-round outer peripheral surface and which comprises an outer toothing, and
a rigid ring element with an inner toothing, wherein the outer toothing of the flexible ring element at least partly meshes with the inner toothing of the rigid ring element in order to transmit a torque at at least one tooth engagement region, wherein the wave generator has a non-round first inner ring which protrudes at least partly into the flexible ring element and is connected in a rotationally fixed manner to a shaft, the harmonic drive comprising a first bearing element, comprising a second inner ring and at least one first outer ring, wherein said second inner ring is secured to the rigid ring element, and wherein each outer ring is secured to the flexible ring element, wherein a drive cover is additionally provided which is secured to a substantially radially extending section of the flexible ring element, and wherein at least one seal extends radially from the drive cover to the flexible ring element,
wherein at least the second inner ring of the first bearing element is equipped with at least one opening, on which a diaphragm is arranged in order to equalize gas pressure and/or temperature differences between an interior of the harmonic drive and the surroundings of the harmonic drive.

6. The harmonic drive according to claim 5, wherein the diaphragm is connected in a materially bonded manner to the second inner ring.

7. The harmonic drive according to claim 1, wherein the first bearing element is a crossed roller bearing, comprising the second inner ring, the first outer ring and a second outer ring arranged axially adjacent to the first outer ring.

* * * * *